W. F. COLLIER.
Wire-Wheels for Casters.
No. 155,928. Patented Oct. 13, 1874.
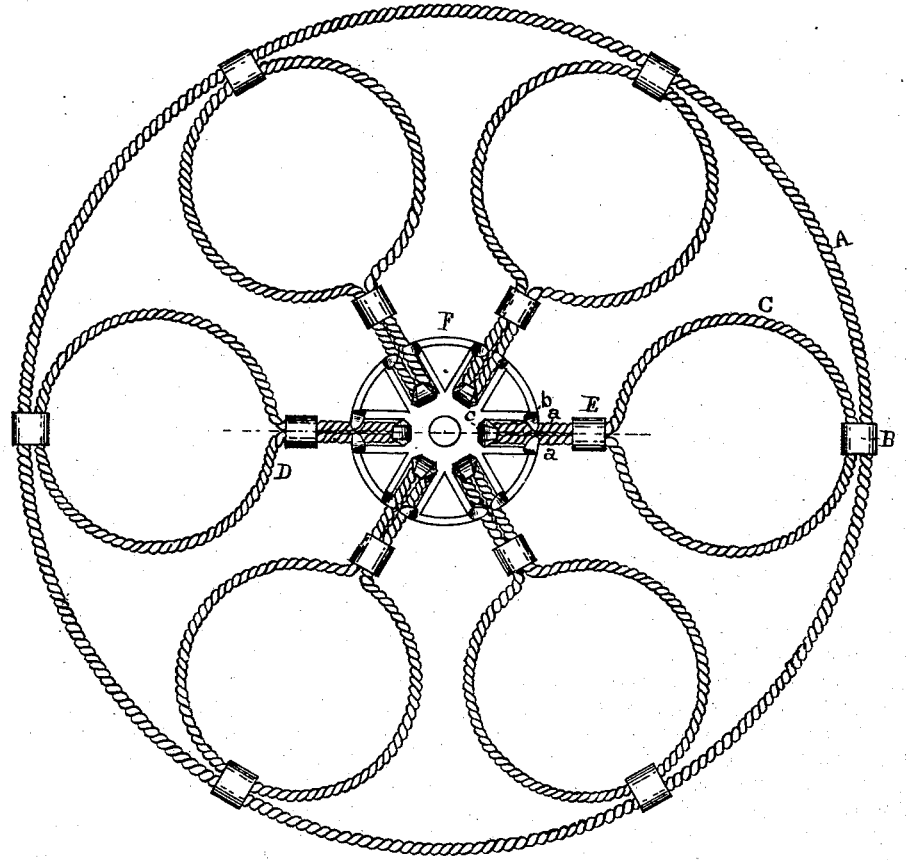
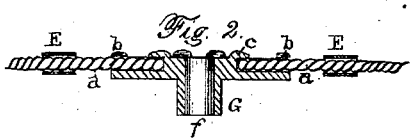
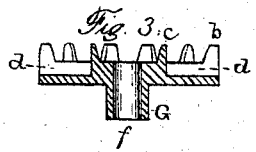
WITNESSES INVENTOR.

UNITED STATES PATENT OFFICE.

WILLIAM F. COLLIER, OF WORCESTER, MASSACHUSETTS.

IMPROVEMENT IN WIRE WHEELS FOR CASTERS.

Specification forming part of Letters Patent No. 155,928, dated October 13, 1874; application filed June 4, 1874.

*To all whom it may concern:*

Be it known that I, WILLIAM F. COLLIER, of the city and county of Worcester, and Commonwealth of Massachusetts, have invented certain new and useful Improvements in Wire Wheels; and I do hereby declare the following to be a full, clear, and exact description of the same, reference being had to the accompanying drawings, which form a part of this specification, and in which—

Figure 1 represents an inside view of my said wheel; and Figs. 2 and 3 represent sections of certain parts thereof, as will be more fully described hereafter.

To enable those skilled in the art to which my invention belongs to make and use the same, I will proceed to describe the construction thereof more in detail.

In the drawings, the part marked A, which forms the rim or periphery of the wheel, is made of twisted wire, the ends being joined within one of the clasps B employed to secure the round parts C of the spokes D to the rim A; or the ends of the wire may be intertwisted together, as in the present instance, and which latter mode I recommend. The spokes D are also formed of twisted wire, and their inner ends are bent and clasped together, clasps E holding the outer shank parts securely together while the inner shank parts are held together, and, at the same time, are securely fastened to the central metallic hub F by means of the lips $b\ b$ and $c$, which are bent down so as to clamp the shank ends $a\ a$ of the spokes D firmly and securely within the slots or recesses $d$ in the metallic hub F. After the parts have thus been secured together, the wheel is tinned, thereby giving it a very bright, neat, and finished appearance. Fig. 2 shows a vertical central section through the hub F and two of the clamps E E, after the wheel has been completed; and Fig. 3 represents a vertical central section through the metallic hub F before it has been combined with the shanks $a\ a$ of the spokes D. The metallic hub F is cast in a single piece with lips $b\ b$ and $c$, slots $d$, and projection G, through which a hole, $f$, is formed by coring or drilling, or by both operations, as preferred.

Said wheel is more particularly designed for use in the construction of casters, the projecting part G and hole $f$ affording good facilities for securing the wheel to the central stem or shaft of the caster. It will be understood that, when applied to the caster, the wheel is turned the other side up, thus bringing the bent lips $b\ b$ and $c$ upon the under side, and out of view. The rim and spokes may be made, if preferred, of plain wire or wound wire; and it is evident that the form of the spokes may be varied without departing from the principle of my invention.

Having described my improved wire wheel for casters and other purposes for which it may be adapted, what I claim therein as new and of my invention, and desire to secure by Letters Patent, is—

1. The combination, with the shank ends $a\ a$ of the spokes D and hub F, of the lips $b\ b$ and $c$, substantially as and for the purposes set forth.

2. The combination, with the central solid metallic hub F and twisted wire ring A, of the twisted wire spokes D, clasps B and E, and lips $b\ b$ and $c$, substantially as and for the purposes set forth.

WM. F. COLLIER.

Witnesses:
 THOS. H. DODGE,
 EDWIN E. MOORE.